United States Patent
Siddhamalli et al.

(10) Patent No.: US 8,524,815 B2
(45) Date of Patent: Sep. 3, 2013

(54) NON HALOGEN FLAME RETARDANT THERMOPLASTIC POLYURETHANE

(75) Inventors: Sridhar K. Siddhamalli, Strongsville, OH (US); Carl A. Brown, Elyria, OH (US)

(73) Assignee: Lubrizol Advanced Materials, Inc., Cleveland, OH (US)

( * ) Notice: Subject to any disclaimer, the term of this patent is extended or adjusted under 35 U.S.C. 154(b) by 666 days.

(21) Appl. No.: 11/910,819

(22) PCT Filed: Apr. 10, 2006

(86) PCT No.: PCT/US2006/013115
§ 371 (c)(1),
(2), (4) Date: Oct. 5, 2007

(87) PCT Pub. No.: WO2006/121549
PCT Pub. Date: Nov. 16, 2006

(65) Prior Publication Data
US 2008/0167408 A1    Jul. 10, 2008

Related U.S. Application Data

(60) Provisional application No. 60/671,009, filed on Apr. 13, 2005.

(51) Int. Cl.
*C08K 5/53* (2006.01)

(52) U.S. Cl.
USPC .................. 524/133; 264/172.15; 428/373

(58) Field of Classification Search
USPC .............................................. 524/133
See application file for complete search history.

(56) References Cited

U.S. PATENT DOCUMENTS

| | | | | |
|---|---|---|---|---|
| 4,158,654 A | * | 6/1979 | Moczygemba et al. | 523/511 |
| 4,201,705 A | * | 5/1980 | Halpern et al. | 523/179 |
| 4,521,582 A | * | 6/1985 | Goyert et al. | 528/67 |
| 5,288,549 A | * | 2/1994 | Zeitler et al. | 428/318.6 |
| 5,457,146 A | * | 10/1995 | Ogoe et al. | 524/409 |
| 5,837,760 A | * | 11/1998 | Hackl et al. | 524/127 |
| 5,993,528 A | | 11/1999 | Mackey | |
| 6,229,044 B1 | * | 5/2001 | Kleiner et al. | 562/23 |
| 6,630,536 B2 | * | 10/2003 | Kuniya et al. | 525/95 |
| 6,632,442 B1 | * | 10/2003 | Chyall et al. | 424/400 |
| 7,273,901 B2 | * | 9/2007 | Sicken et al. | 524/126 |
| 2005/0203244 A1 | * | 9/2005 | Hackl et al. | 524/589 |

FOREIGN PATENT DOCUMENTS

| | | |
|---|---|---|
| CA | 2554036 A1 | 8/2005 |
| EP | 0189644 A2 | 8/1986 |
| EP | 0 512 629 * | 11/1992 |
| EP | 0684250 A1 | 11/1995 |
| EP | 0924249 A1 | 6/1999 |
| WO | WO 03/099896 * | 12/2003 |
| WO | 2005/073266 A1 | 8/2005 |
| WO | 2006/003421 A1 | 1/2006 |
| WO | 2006/005772 A1 | 1/2006 |

* cited by examiner

*Primary Examiner* — Doris Lee
(74) *Attorney, Agent, or Firm* — Thoburn T. Dunlap

(57) ABSTRACT

Flame retardant thermoplastic polyurethane (TPU) compositions are disclosed having a flame retardant package comprising an organo-phosphinate component, an organo-phosphate component, and a polyhydric alcohol. The flame retardant components may be present in an amount from about 5 to about 40 weight percent of the phosphinate compound; from about 5 to about 20 weight percent of the phosphate compound, and from about 0.1 to about 15 weight percent of the polyhydric alcohol, based on the total weight of the TPU composition. Processes are disclosed to make the TPU compositions and to make wire and cable constructions employing the TPU compositions as the jacket of the wire and cable constructions. The TPU compositions exhibit excellent flame retardant capabilities as measured by Limited Oxygen Index testing and/or UL 94 Vertical Burn tests.

10 Claims, No Drawings

NON HALOGEN FLAME RETARDANT THERMOPLASTIC POLYURETHANE

CROSS REFERENCE TO RELATED APPLICATION

This application claims priority from PCT Application Serial No. PCT/US2006/013115 filed on Apr. 10, 2006, which claims the benefit of U.S. Provisional Application No. 60/671,009 filed on April 13, 2005.

FIELD OF THE INVENTION

The present invention relates to flame retardant thermoplastic polyurethane (TPU) compositions, and more particularly to flame retardant thermoplastic polyurethane compositions comprising a plurality of non halogen flame retardants. The TPU compositions are useful for applications where high flame performance is desirable, such as wire and cable applications, blown film, molding applications, and the like. This invention also relates to processes to produce the TPU compositions and processes to produce wire and cable jacketing.

BACKGROUND OF THE INVENTION

Halogen additives, such as those based on fluorine, chlorine, and bromine, have been used to give flame retardant properties to TPU compositions. In recent years, certain end use applications are specifying that the TPU composition be halogen free. This has required TPU formulators to search for other flame retardants to replace the previously used halogen additives.

U.S. Patent Application Publication No. US 2005/0011401 discloses an elastic floor covering material which comprises a phosphinate salt or a diphosphinate salt as a flame retardant.

U.S. Pat. No. 6,777,466 issued to Eckstein, et al. discloses the use of melamine cyanurate as the only organic flame retardant additive in a TPU composition.

U.S. Pat. No. 6,547,992 issued to Schlosser et al. discloses a flame retardant combination including certain phosphinate and/or diphosphinate components and a synthetic inorganic compound and/or a mineral product. Additionally, the disclosed flame retardant combination may include nitrogen-containing components.

U.S. Pat. No. 6,365,071 issued to Jenewein et al. discloses a flame retardant combination for thermoplastic polymers including certain phosphinate and/or diphosphinate components and certain nitrogen-containing components.

U.S. Pat. No. 6,509,401 issued to Jenewein et al. discloses a flame retardant combination including certain phosphorus-containing components and certain nitrogen-containing components for thermoplastic polymers.

U.S. Pat. No. 6,255,371 issued to Schlosser et al. discloses a flame retardant combination including certain phosphinate and/or diphosphinate components in combination with certain components derived from melamine.

U.S. Pat. No. 6,207,736 issued to Nass et al. discloses a flame retardant combination including certain phosphinic acid salts and/or diphosphinic acid salts and certain nitrogen-containing phosphate components.

Still, there exists a need in the art for effective non-halogenated flame retardant combinations that impart flame retardant characteristics to thermoplastic polyurethane compositions while not impairing mechanical strength and processability.

SUMMARY OF THE INVENTION

An object of an exemplary embodiment is to provide a non-halogen flame retarded TPU composition which provides the desired flame retardant capabilities as well as exhibiting acceptable processing and mechanical properties.

An object of an exemplary embodiment is to provide a TPU composition which can be used as a jacket in a wire and cable construction.

An object of an exemplary embodiment is to provide a process for making a TPU composition which is suitable for flame retarded jacketing in wire and cable construction.

An object of an exemplary embodiment is to provide a flame retardant package for use with thermoplastic polyurethanes.

An object of an exemplary embodiment is to provide a method for rendering a thermoplastic polyurethane composition flame retardant.

An object of an exemplary embodiment is to provide a wire and cable jacket construction utilizing a flame retardant TPU composition.

In one aspect of the invention, a thermoplastic polyurethane (TPU) composition is provided. The composition comprises at least one thermoplastic polyurethane polymer and a flame retardant package.

In one aspect, the composition comprises at least one thermoplastic polyurethane and from about 5 to about 40 weight percent of the proprietary phosphinate compound Exolit® OP 1311; from about 5 to about 20 weight percent of the proprietary halogen-free phosphate flame retardant NcendX® P-30; and from about 0.1 to about 15 weight percent of dipentaerythritol, wherein the weight percents are based on the total weight of the thermoplastic polyurethane composition. The composition may further include from about 0 to about 10 weight percent of ammonium pentaborate or zinc borate.

In another aspect, the thermoplastic polyurethane polymer is selected from polyester polyurethane, polyether polyurethane, polycarbonate polyurethane, and blends thereof.

In another aspect, the composition includes from about 0 to about 5 weight percent of an inorganic flame retardant component such as talc, ammonium phosphate, ammonium polyphosphate, calcium carbonate, antimony oxide, clay, montmorillonite clay, and mixtures thereof.

In another aspect the composition comprises, as organic flame retardant components, a phosphinate compound, a phosphate compound based flame retardant, and a polyhydric alcohol.

In another aspect, the flame retardant package includes three non-halogenated flame retardant components, wherein the flame retardant package is present in an amount sufficient to confer at least one predetermined flame retardant characteristic to the thermoplastic polyurethane composition.

In another aspect, the predetermined flame retardant characteristic is a limited oxygen index of at least about 35 as measured according to ASTM D-2863.

In another aspect, the predetermined flame retardant characteristic is a V-0 flame rating at a thickness of about 75 mils (1.90 mm) as measured in accordance with Underwriters Laboratory 94 vertical burn test (UL 94). In another aspect, the predetermined flame retardant characteristic is a Limited Oxygen Index, LOI, of at least 35 for compositions useful in wire and cable jackets in accordance with applicable standards such as UL 1581, UL 1666, CSA FT-1, FT-4, UL 1685, IEEE 1202, IEC 332-3, and the like.

In another aspect, the flame retardant package includes a phosphinate based flame retardant, and a polyhydric alcohol. The flame retardant package may further include an inorganic flame retardant component.

In another aspect, in a method of rendering a thermoplastic polyurethane composition flame retardant, a flame retardant package is used in an amount sufficient to confer at least one predetermined flame retardant characteristic to the thermoplastic polyurethane composition.

In another aspect, thermoplastic polyurethane ingredients comprising a polymer intermediate selected from hydroxyl terminated polyester, hydroxyl terminated polyether, hydroxyl terminated polycarbonate, and mixtures thereof; a polyisocyanate; and a chain extender are mixed in a mixing device capable of shear mixing the thermoplastic polyurethane ingredients. A flame retardant package is added to the mixing device, wherein the flame retardant package includes Exolit® OP 1311, a proprietary phosphinate based additive and dipentaerythritol.

In another aspect, a wire and cable construction is produced by extruding an insulation layer of a non-conducting polymeric material onto at least one metal conductor; and extruding a flame retardant jacket to cover the insulated metal conductor. The jacket is a thermoplastic polyurethane composition comprising at least one thermoplastic polyurethane polymer; from about 5 to about 40 weight percent of a first organic non-halogenated flame retardant component comprising a phosphinate compound; from about 5 to about 20 weight percent of a second organic non-halogenated flame retardant component comprising a phosphate based flame retardant; and from about 0.1 to about 15 weight percent of a third organic non-halogenated flame retardant component selected from pentaerythritol and dipentaerythritol, based on the total weight of the thermoplastic polyurethane composition. The composition may further include from about 0 to about 10 weight percent of ammonium pentaborate or zinc borate.

DETAILED DESCRIPTION OF THE INVENTION

The thermoplastic polyurethanes (TPU) compositions of the present invention comprise at least one TPU polymer along with flame retardant additives.

The TPU polymer type used in this invention can be any conventional TPU polymer that is known to the art and in the literature as long as the TPU polymer is capable of imparting the desired mechanical and physical properties to the final flame retardant composition.

Embodiments of the invention include adding certain flame retardant components to the TPU polymer to achieve the desired flame retardant properties of the TPU composition. Of particular interest are organic flame retardant components comprising a phosphinate compound based on an organic phosphinic salt. Organic phosphinates are a recent addition to the sphere of flame retardants used in engineering thermoplastics. One preferred phosphinate is marketed as the propriety compound Exolit® OP 1311, available from Clariant GmbH, Germany. An organic phosphinate is used in conjunction with other organic flame retardants in an exemplary embodiment of the flame retardant package. The phosphinate compound may be present in an exemplary embodiment of the flame retardant TPU composition in an amount from about 5 to about 40 weight percent, more preferably from about 15 to about 25 weight percent, based on the total weight of the TPU composition.

Other organic flame retardant components include organic phosphates such as triaryl phosphates, and preferably a triphenyl phosphate, and more preferably a proprietary phosphorus based flame retardant, namely NcendX® P-30 from Albermarle Corporation. The organic phosphate may be present in an exemplary embodiment in an amount from about 5 to about 20 weight percent, more preferably from about 5 to about 10 weight percent, based on the total weight of the TPU composition.

Other organic flame retardant components include polyhydric alcohols such as pentaerythritol and dipentaerythritol. The polyhydric alcohol may be present in an exemplary embodiment in an amount from about 0.1 to about 15 weight percent, more preferably from about 2.5 to about 10 weight percent, based on the total weight of the TPU composition. The composition may further include from about 0 to about 10 weight percent of ammonium pentaborate or zinc borate.

In addition, various conventional inorganic flame retardant components may be employed in the flame retardant TPU composition. Suitable inorganic flame retardants include any of those known to those skilled in the art, such as ammonium phosphate, ammonium polyphosphate, calcium carbonate, antimony oxide, and clay including montmorillonite clay which is often referred to as nano-clay. The inorganic flame retardants may be used at a level of from 0 to about 5 weight percent of the TPU composition. Preferably, the inorganic flame retardants are not present and the composition includes only the TPU and the organic flame retardant components.

Thus, in an exemplary embodiment, a flame retardant thermoplastic polyurethane composition comprises at least one thermoplastic polyurethane polymer and a flame retardant package comprising an organic phosphinate compound, an organic phosphate compound, and a polyhydric alcohol. In other exemplary embodiments, inorganic flame retardant fillers may be incorporated into the flame retardant package.

For some applications, auxiliary additives, which are not flame retardants per se, may be used in the TPU compositions of this invention. Additives such as colorants, antioxidants, antiozonates, light stabilizers, inert fillers, and the like may be used in amounts of from 0 to 5 weight percent of the TPU composition. Preferably, auxiliary additives are not present in the TPU composition.

In one embodiment, the TPU polymer may be prepared by reacting a polyisocyanate with an intermediate such as a hydroxyl terminated polyester, a hydroxyl terminated polyether, a hydroxyl terminated polycarbonate or mixtures thereof, with one or more glycol chain extenders, all of which are well known to those skilled in the art. U.S. Pat. No. 6,777,466 to Eckstein et al. provides detailed disclosure of processes to provide certain TPU polymers that may be utilized in embodiments of the present invention and is incorporated herein in its entirety.

The TPU polymer type used in this invention can be any conventional TPU polymer that is known to the art and in the literature as long as the TPU polymer has adequate molecular weight. The TPU polymer is generally prepared by reacting a polyisocyanate with an intermediate such as a hydroxyl terminated polyester, a hydroxyl terminated polyether, a hydroxyl terminated polycarbonate or mixtures thereof, with one or more chain extenders, all of which are well known to those skilled in the art.

The hydroxyl terminated polyester intermediate is generally a linear polyester having a number average molecular weight (Mn) of from about 500 to about 10,000, desirably from about 700 to about 5,000, and preferably from about 700 to about 4,000, an acid number generally less than 1.3 and preferably less than 0.8. The molecular weight is determined by assay of the terminal functional groups and is related to the number average molecular weight. The polymers are produced by (1) an esterification reaction of one or more glycols with one or more dicarboxylic acids or anhydrides or (2) by transesterification reaction, i.e., the reaction of one or more glycols with esters of dicarboxylic acids. Mole ratios generally in excess of more than one mole of glycol to acid are preferred so as to obtain linear chains having a preponderance of terminal hydroxyl groups. Suitable polyester intermediates also include various lactones such as polycaprolactone typically made from ε-caprolactone and a bifunctional initiator such as diethylene glycol. The dicarboxylic acids of the desired polyester can be aliphatic, cycloaliphatic, aromatic, or combinations thereof. Suitable dicarboxylic acids which may be used alone or in mixtures generally have a total of from 4 to 15 carbon atoms and include: succinic, glutaric, adipic, pimelic, suberic, azelaic, sebacic, dodecanedioic, isophthalic, terephthalic, cyclohexane dicarboxylic, and the like. Anhydrides of the above dicarboxylic acids such as phthalic anhydride, tetrahydrophthalic anhydride, or the like, can also be used. Adipic acid is the preferred acid. The glycols which are reacted to form a desirable polyester intermediate can be aliphatic, aromatic, or combinations thereof, and have a total of from 2 to 12 carbon atoms, and include ethylene glycol, 1,2-propanediol, 1,3-propanediol, 1,3-butanediol, 1,4-butanediol, 1,5-pentanediol, 1,6-hexanediol, 2,2-dimethyl-1,3-propanediol, 1,4-cyclohexanedimethanol, decamethylene glycol, dodecamethylene glycol, and the like, 1,4-butanediol is the preferred glycol.

Hydroxyl terminated polyether intermediates are polyether polyols derived from a diol or polyol having a total of from 2 to 15 carbon atoms, preferably an alkyl diol or glycol which is reacted with an ether comprising an alkylene oxide having from 2 to 6 carbon atoms, typically ethylene oxide or propylene oxide or mixtures thereof. For example, hydroxyl functional polyether can be produced by first reacting propylene glycol with propylene oxide followed by subsequent reaction with ethylene oxide. Primary hydroxyl groups resulting from ethylene oxide are more reactive than secondary hydroxyl groups and thus are preferred. Useful commercial polyether polyols include poly(ethylene glycol) comprising ethylene oxide reacted with ethylene glycol, poly (propylene glycol) comprising propylene oxide reacted with propylene glycol, poly(tetramethyl glycol) comprising water reacted with tetrahydrofuran (PTMG). Polytetramethylene ether glycol (PTMEG) is the preferred polyether intermediate. Polyether polyols further include polyamide adducts of an alkylene oxide and can include, for example, ethylenediamine adduct comprising the reaction product of ethylenediamine and propylene oxide, diethylenetriamine adduct comprising the reaction product of diethylenetriamine with propylene oxide, and similar polyamide type polyether polyols. Copolyethers can also be utilized in the current invention. Typical copolyethers include the reaction product of THF and ethylene oxide or THF and propylene oxide. These are available from BASF as Poly THF B, a block copolymer, and poly THF R, a random copolymer. The various polyether intermediates generally have a number average molecular weight (Mn), as determined by assay of the terminal functional groups which is an average molecular weight, of from about 500 to about 10,000, desirably from about 500 to about 5,000, and preferably from about 700 to about 3,000.

The polycarbonate-based polyurethane resin of this invention is prepared by reacting a diisocyanate with a blend of a hydroxyl terminated polycarbonate and a chain extender. The hydroxyl terminated polycarbonate can be prepared by reacting a glycol with a carbonate.

U.S. Pat. No. 4,131,731 discloses hydroxyl terminated polycarbonates and their preparation. Such polycarbonates are linear and have terminal hydroxyl groups with essential exclusion of other terminal groups. The essential reactants are glycols and carbonates. Suitable glycols are selected from cycloaliphatic and aliphatic diols containing 4 to 40, and preferably 4 to 12 carbon atoms, and from polyoxyalkylene glycols containing 2 to 20 alkoxy groups per molecular with each alkoxy group containing 2 to 4 carbon atoms. Diols suitable for use in the present invention include aliphatic diols containing 4 to 12 carbon atoms such as butanediol-1,4, pentanediol-1,4, neopentyl glycol, hexanediol-1,6,2,2,4-trimethylhexanediol-1,6, decanediol-1,10, hydrogenated dilinoleylglycol, hydrogenated dioleylglycol; and cycloaliphatic diols such as cyclohexanediol-1,3, dimethylolcyclohexane-1,4, cyclohexanediol-1,4, dimethylolcyclohexane-1,3,1,4-endomethylene-2-hydroxy-5-hydroxymethyl cyclohexane, and polyalkylene glycols. The diols used in the reaction may be a single diol or a mixture of diols depending on the properties desired in the finished product.

Polycarbonate intermediates which are hydroxyl terminated are generally those known to the art and in the literature. Suitable carbonates are selected from allylene carbonates composed of a 5 to 7 membered ring having the following general formula:

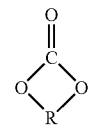

where R is a saturated divalent radical containing 2 to 6 linear carbon atoms. Suitable carbonates for use herein include ethylene carbonate, trimethylene carbonate, tetramethylene carbonate, 1,2-propylene carbonate, 1,2-butylene carbonate, 2,3-butylene carbonate, 1,2-ethylene carbonate, 1,3-pentylene carbonate, 1,4-pentylene carbonate, 2,3-pentylene carbonate, and 2,4-pentylene carbonate.

Also, suitable herein are dialkylcarbonates, cycloaliphatic carbonates, and diarylcarbonates. The dialkylcarbonates can contain 2 to 5 carbon atoms in each alkyl group and specific examples thereof are diethylcarbonate and dipropylcarbonate. Cycloaliphatic carbonates, especially dicycloaliphatic carbonates, can contain 4 to 7 carbon atoms in each cyclic structure, and there can be one or two of such structures. When one group is cycloaliphatic, the other can be either alkyl or aryl. On the other hand, if one group is aryl, the other can be alkyl or cycloaliphatic. Preferred examples of diarylcarbonates, which can contain 6 to 20 carbon atoms in each aryl group, are diphenylcarbonate, ditolylcarbonate, and dinaphthylcarbonate.

The reaction is carried out by reacting a glycol with a carbonate, preferably an alkylene carbonate in the molar range of 10:1 to 1:10, but preferably 3:1 to 1:3 at a temperature of 100° C. to 300° C. and at a pressure in the range of 0.1 to 300 mm of mercury in the presence or absence of an ester interchange catalyst, while removing low boiling glycols by distillation.

More specifically, the hydroxyl terminated polycarbonates are prepared in two stages. In the first stage, a glycol is reacted with an alkylene carbonate to form a low molecular weight hydroxyl terminated polycarbonate. The lower boiling point glycol is removed by distillation at 100° C. to 300° C., preferably at 150° C. to 250° C., under a reduced pressure of 10 to 30 mm Hg, preferably 50 to 200 mm Hg. A fractionating column is used to separate the by-product glycol from the reaction mixture. The by-product glycol is taken off the top of the column and the unreacted alkylene carbonate and glycol reactant are returned to the reaction vessel as reflux. A current of inert gas or an inert solvent can be used to facilitate removal of by-product glycol as it is formed. When amount of by-product glycol obtained indicates that degree of polymerization of the hydroxyl terminated polycarbonate is in the range of 2 to 10, the pressure is gradually reduced to 0.1 to 10 mm Hg and the unreacted glycol and alkylene carbonate are removed. This marks the beginning of the second stage of reaction during which the low molecular weight hydroxyl terminated polycarbonate is condensed by distilling off glycol as it is formed at 100° C. to 300° C., preferably 150° C. to 250° C. and at a pressure of 0.1 to 10 mm Hg until the desired molecular weight of the hydroxyl terminated polycarbonate is attained. Molecular weight (Mn) of the hydroxyl terminated polycarbonates can vary from about 500 to about 10,000 but in a preferred embodiment, it will be in the range of 500 to 2500.

Suitable extender glycols (i.e., chain extenders) are lower aliphatic or short chain glycols having from about 2 to about 10 carbon atoms and include for instance ethylene glycol, diethylene glycol, propylene glycol, dipropylene glycol, 1,4-butanediol, 1,6-hexanediol, 1,3-butanediol, 1,5-pentanediol, 1,4-cyclohexanedimethanol hydroquinone di(hydroxyethyl) ether, neopentyglycol, and the like, with 1,4-butanediol being preferred.

The desired TPU polymer used in the TPU composition of this invention is generally made from the above-noted intermediates such as a hydroxyl terminated polyesters, polyether, or polycarbonate, preferably polyether, which is further reacted with a polyisocyanate, preferably a diisocyanate, along with extender glycol desirably in a so-called one-shot process or simultaneous coreaction of polyester, polycarbonate or polyether intermediate, diisocyanate, and extender glycol to produce a high molecular weight linear TPU polymer. The preparation of the macroglycol is generally well known to the art and to the literature and any suitable method may be used. The weight average molecular weight (Mw) of the TPU polymer is generally about 80,000 to 800,000, and preferably from about 90,000 to about 450,000 Daltons. The equivalent weight amount of diisocyanate to the total equivalent weight amount of hydroxyl containing components, that is the hydroxyl terminated polyester, polyether, or poycarbonate, and chain extender glycol, is from about 0.95 to about 1.10, desirably from about 0.96 to about 1.02, and preferably from about 0.97 to about 1.005. Suitable diisocyanates include aromatic diisocyanates such as: 4,4'-methylenebis-(phenyl isocyanate) (MDI); m-xylylene diisocyanate (XDI), phenylene-1,4-diisocyanate, naphthalene-1,5-diisocyanate, diphenylmethane-3,3'-dimethoxy-4,4'-diisocyanate and toluene diisocyanate (TDI); as well as aliphatic diisocyanates such as isophorone diisocyanate (IPDI), 1,4-cyclohexyl diisocyanate (CHDI), decane-1,10-diisocyanate, and dicyclohexylmethane-4,4'-diisocyanate. The most preferred diisocyanate is 4,4'-methylenebis(phenyl isocyanate), i.e., MDI.

The desired TPU polymer utilized in the TPU composition is generally made from the above-noted intermediates in a so-called one-shot process or simultaneous co-reaction of polyester, polycarbonate or polyether intermediate; polyisocyanate; and chain extender to produce a high molecular weight linear TPU polymer.

In the one-shot polymerization process which generally occurs in situ, a simultaneous reaction occurs between three components, that is, the one or more intermediates, the one or more polyisocyanates, and the one or more chain extenders, with the reaction generally being initiated at temperatures of from about 100° C. to about 120° C. Inasmuch as the reaction is exothermic, the reaction temperature generally increases to about 220° C.-250° C. In one exemplary embodiment, the TPU polymer may be pelletized following the reaction. The flame retardant components may be incorporated with the TPU polymer pellets to form a flame retardant composition in a subsequent process.

The TPU polymer and organic flame retardant components may be compounded together by any means known to those skilled in the art. If a pelletized TPU polymer is used, the polymer may be melted at a temperature of about 150° C. to 215° C., preferably from about 160-190° C., and more preferably from about 170-180° C. The particular temperature used will depend on the particular TPU polymer used, as is well understood by those skilled in the art. The TPU polymer and the flame retardant components are blended to form an intimate physical mixture. Blending can occur in any commonly used mixing device able to provide shear mixing, but a twin screw extruder having multiple heat zones with multiple feeding ports is preferably used for the blending and melting process (compounding).

The TPU polymer and flame retardant components may be pre-blended before adding to the compounding extruder or they may be added or metered into the compounding extruder in different streams and in different zones of the extruder.

In an alternate embodiment, the TPU polymer is not pelletized prior to the addition of the flame retardant components. Rather, the process for forming a flame retardant thermoplastic polyurethane composition is a continuous in situ process. The ingredients to form the thermoplastic polyurethane polymer are added to a reaction vessel, such as a twin screw extruder as set forth above. After formation of the thermoplastic polyurethane polymer, the flame retardant components may be added or metered into the extruder in different streams and/or in different zones of the extruder in order to form a thermoplastic polyurethane composition. The flame retardant components are added in a quantity sufficient to impart at least one predetermined flame retardant characteristic to the composition, as set forth in further detail below.

The resultant TPU composition may exit the extruder die in a molten state and be pelletized and stored for further use in making finished articles. The finished articles may comprise injection-molded parts, especially using TPU compositions based on polyester polyurethane. Other finished articles may comprise extruded profiles. The TPU composition may be utilized as a cable jacket as set forth in further detail below.

Thermoplastic polyurethanes are generally valued in end use applications because of their abrasion and wear resistance, low temperature flexibility, toughness and durability, ease of processing, and other attributes. When additives, such as flame retardants, are present in a TPU composition, there may be some reduction in the desired material properties. The flame retardant package should thus impart the desired flame retardancy without sacrificing other material properties.

One property to consider is the desired ultimate tensile strength of the TPU composition as measured according to ASTM D412. In one embodiment, the ultimate tensile strength is at least 1500 psi and elongation of 150%. It is also important to note that the ultimate tensile strength referred to in this disclosure is the tensile strength measured on the flame retardant TPU composition after it is processed into a finished part.

The disclosed TPU compositions, because of their flame retardant properties, abrasion resistance and good tensile strength, are particularly suited for use as jacketing for electrical conductors in wire and cable construction applications. One or more insulated conductors may be wrapped with insulating material such as fiberglass or other non-flammable textile. The one or more conductors are then encased in a jacket material (i.e., the TPU composition) to protect the electrical conductors. It is necessary for this jacket material to be flame resistant in case a fire occurs.

The types of wire and cable constructions that are most suitable for using a jacket made from the TPU compositions are detailed in the UL-1581 standard. The UL-1581 standard contains specific details of the conductors, of the insulation, of the jackets and other coverings, and of the methods of sample preparation, of specimen selection and conditioning, and of measurement and calculation.

The fire performance of a wire and cable construction can be influenced by many factors, with the jacket being one factor. The flammability of the insulation material can also affect the fire performance of the wire and cable construction, as well as other inner components, such as paper wrappings, fillers, and the like.

Exemplary embodiments of wire and cable constructions are made by extruding the TPU composition onto a bundle of insulated conductors to form a jacket around the insulated conductors. The thickness of the jacket depends on the requirements of the desired end use application. Typical thickness of the jacket is from about 0.010 to 0.200 inch and more typical from about 0.020 to about 0.060 inch. The thinnest jacket is typically about 20 to 30 mils (0.508 to 0.762 mm) and therefore, a minimum LOI of 35 is desirable at that thickness to make the jacket suitable for use in tray cable burn applications.

The TPU compositions may be extruded into the jacket from previously made TPU composition. Usually, the TPU composition is in the form of pellets for easy feeding into the extruder. This method is the most common since the TPU composition is not normally made by the same party that makes the wire and cable construction. However, in accordance with an exemplary embodiment of the invention, the wire and cable jacket could be extruded directly from the compounding extruder without going through the separate step of pelletizing the flame retardant TPU composition.

Another property of the clean TPU which may be altered upon addition of flame retardant components is processability. Thus, it is advantageous to employ a flame retardant package that only minimally impairs processability, if at all. For purposes of this disclosure "processability" refers to two phases: the initial compounding (and pelletizing) of the TPU composition and secondary processing, such as extrusion into wire and cable jacket. In the initial compounding phase, the desired qualities related to strand integrity, lack of die drool, uniformity in pelletizing, and the like. In secondary processing, additional qualities may be desired such as the ability to extrude a sheet, aesthetic appearance, lack of brittleness, smooth surface (not bumpy or gritty), and so on. The surface should be smooth, that is not have raised or depressed areas of greater than 0.1 mm. The extruded TPU should not have torn or jagged edges and should be able to retain its melt strength and not foam from outgassing. The TPU should also have a wide processing temperature window, desirably the temperature window should be at least 10° F. and preferably at least 20° F. That is, the extrusion temperature can be varied by 10° F. or 20° F. and the TPU composition retains good extrusion qualities. This is very important because in a large scale production environment it is difficult to maintain an exact set extrusion temperature. These above features define what is referred to as good processability.

One flame retardant characteristic conferred on the TPU composition may be an improved limiting oxygen index (LOI). In many applications, the flame retardant TPU must meet a certain LOI standard. The LOI test has been formalized as ASTM D2863. The LOI is the minimum percentage of oxygen which allows a sample to sustain combustion under specified conditions in a candle-like fashion, and thus may be considered to measure the ease of extinction of a sample. An exemplary embodiment of the present invention provides a flame retardant TPU composition having an LOI of at least about 35. LOI results of at least 35 are very unexpected for TPU compositions, as normally the LOI is less than 30, and more typical about 25 for flame retarded TPU compositions. Many customers require an LOI of 35 for cables that are placed in trays in buildings and this requirement of a 35 LOI has precluded the use of TPU in this application.

Another flame retardant characteristic is measured by the Underwriters Laboratories Vertical Burn Standard—UL 94(UL-94). An exemplary embodiment of the present invention provides a flame retardant TPU composition able to obtain a V0 rating on UL-94 test at a thickness of about 75 mils (1.90 mm). As the UL rating should always be reported with the thickness, an exemplary embodiment achieves a V0 rating at a thickness of about 75 mils (0.075 inches, 1.90 mm).

The invention will be better understood by reference to the following examples.

Another useful ingredient for the TPU compositions of this invention is antioxidants, such as hindered phenols and dialkylated diphenylamine. The antioxidants, if used, are used at a level of from 0.05 to 2.0 weight percent, preferably from 0.1 to 1.0, and most preferred is 0.1 to 0.5 weight percent based on the total weight of the TPU composition.

EXAMPLES

Examples 1 and 2 are presented to show the preferred non-halogen flame retardants in a polyether TPU formulation. Examples 1 and 2 use a 95 Shore A hardness commercially available TPU (Estane® 58212) in pellet form, which was made from a PTMEG ether intermediate, butanediol (BDO) chain extender and MDI diisocyanate. In Example 2, the three required non-halogen flame retardants (phosphinate, phosphate and polyhydric alcohol) were added to the TPU by shear mixing the ingredients in an extruder. In Examples 1 and 3, the phosphate flame retardant, which is a liquid, was first swelled into the TPU pellets and the other ingredients were added by shear mixing in an extruder.

Example 3 is presented to show the preferred non-halogen flame retardants in a polyester TPU formulation. The polyether TPU is a commercially available TPU (Estane® X-4809) which has a Shore D hardness of 50D.

Table 1 below shows the formulations in weight % used in Examples 1-3.

Table 2 below shows the test results exhibited by the formulations of Examples 1-3.

TABLE 1

| Ingredients (wt. %) | Examples | | |
|---|---|---|---|
| | 1 | 2 | 3 |
| Ether TPU[1] | 65.0 | 63.0 | — |
| Ester TPU[2] | — | — | 63.0 |
| Phosphinate[3] | 20.0 | 20.0 | 20.0 |
| Phosphate[4] | 7.5 | 7.0 | 7.0 |
| Dipentaerythritol | 5.0 | 7.0 | 7.0 |
| Talc | 2.5 | 2.8 | 2.8 |
| Dialkylated Diphenylamine[5] | | 0.1 | 0.1 |
| Hindered Phenol[6] | | 0.1 | 0.1 |
| | 100.0 | 100.0 | 100.0 |

[1]Estane ® 58212 polyether TPU, 95A Shore hardness from Noveon, Inc.
[2]Estane ® X-4809 polyester TPU, 50D Shore hardness from Noveon, Inc.
[3]Exolit ® OP 1311 from Clariant GmbH
[4]NcendX ® P-30 from Albermarle Corporation
[5]Stalite ® S from Noveon, Inc.
[6]Irganox ® 245 from Ciba-Geigy Corp.

The test results of the above compositions are shown in Table 2 below.

TABLE 2

| Physical Property Data | Examples | | |
|---|---|---|---|
| | 1 | 2 | 3 |
| LOI % Index | 39 | 37 | 35 |
| UL 94 V Rating @ 30 mils | VO | * | * |
| UL 94 V Rating @ 75 mils | * | VO | * |
| Flex Modulus rt Psi 0.5 in/min | 12,200 | 12,100 | * |
| Graves Tear | | | |
| lbf | 20.9 | 30.9 | * |
| lbf/in. | 261 | 405 | * |
| Trouser Tear | | | |
| lbf | 1.8 | 2.7 | * |
| lb/in. | 64 | 91 | * |
| Tensile Stress psi @ % elongation | | | |
| 50% | 1340 | 1740 | 1650 |
| 100% | 1350 | 1860 | 1690 |
| 200% | 1390 | 2060 | 1860 |
| 300% | 1490 | 2300 | 2190 |
| 400% | — | — | 2440 |
| Stress @ Break | 1530 | 2460 | 2800 |
| % Elongation @ Break | 328 | 348 | 403 |
| Hardness - Shore A | | | |
| Peak | 95.6 | 95.6 | * |
| 5 Seconds | 94.2 | 94.6 | * |
| Taber Abrasion H-18 Loss of Mass (g) | | | |
| 1000 g, 1000 cycles | * | 0.1818 | * |

* indicates the property was not tested.

All three compounds exhibited good processability in both the production of the TPU polymer and in the extrusion of the compound into sheet form.

While in accordance with the Patent statutes, the best mode and preferred embodiment has been set forth, the scope of the invention is not limited thereto, but rather by the scope of the attached claims.

What is claimed is:

1. A flame retardant thermoplastic polyurethane composition having good melt processing characteristics comprising:
  (a) at least one thermoplastic polyurethane polymer; wherein said thermoplastic polyurethane is formed by the reaction of:
    (i) hydroxyl terminated intermediate,
    (ii) aromatic diisocyanate, and
    (iii) glycol chain extender;
  (b) from about 15 to about 25 weight percent of a first organic non-halogenated flame retardant component comprising a phosphinate compound;
  (c) from about 5 to about 10 weight percent of a second organic non-halogenated flame retardant component comprising a phosphate compound;
  (d) from about 2.5 to about 10 weight percent of a third organic non-halogenated flame retardant component selected from pentaerythritol and dipentaerythritol; and
  (e) talc;
  wherein the weight percents are based on the total weight of the thermoplastic polyurethane composition, and wherein said flame retarded thermoplastic polyurethane has a VO rating at 1.90 mm thickness as measured according to UL 94 vertical burn test and a Limited Oxygen Index of at least about 35 as measured according to ASTM D2863.

2. The flame retardant thermoplastic composition of claim 1 wherein in (a) the thermoplastic polyurethane polymer is selected from polyester polyurethane, polyether polyurethane, polycarbonate polyurethane, and blends thereof.

3. The flame retardant thermoplastic composition of claim 2 wherein in (a) the thermoplastic polyurethane polymer is polyether polyurethane.

4. The flame retardant thermoplastic composition of claim 1 further comprising:
  (f) from about 0 to about 5 weight percent of an inorganic flame retardant component, based on the total weight of the thermoplastic polyurethane composition.

5. The flame retardant thermoplastic composition of claim 4 wherein the inorganic flame retardant component, if present, is selected from ammonium phosphate, ammonium polyphosphate, ammonium pentaborate, zinc borate, calcium carbonate, antimony oxide, clay, montmorillonite clay, and mixtures thereof.

6. A flame retardant thermoplastic polyurethane composition of claim 1 further comprising from about 0.05 to about 2.0 weight percent of antioxidant.

7. A flame retardant thermoplastic polyurethane composition of claim 6 wherein said antioxidant is selected from hindered phenols and dialkylated diphenylamine, and mixtures thereof.

8. A flame retardant thermoplastic polyurethane composition comprising:
  (a) at least one thermoplastic polyurethane polymer; wherein said thermoplastic polyurethane is formed by the reaction of:
    (i) hydroxyl terminated intermediate,
    (ii) aromatic diisocyanate, and
    (iii) glycol chain extender; and
  (b) a flame retardant package including:
    (i) a first non-halogenated flame retardant component comprising a phosphinate compound;
    (ii) a second non-halogenated flame retardant component comprising an organic phosphate compound;
    (iii) a third non-halogenated flame retardant component void of phosphate; and
    (iv) talc
  wherein the flame retardant package is present in an amount sufficient to confer to the thermoplastic polyurethane a limited oxygen index of at least about 35 as measured according to ASTM D-2863.

9. A shaped article comprising a flame retardant thermoplastic polyurethane composition, wherein the composition comprises:
  (a) at least one thermoplastic polyurethane polymer; wherein said thermoplastic polyurethane is formed by the reaction of:
    (i) hydroxyl terminated intermediate,
    (ii) aromatic diisocyanate, and
    (iii) glycol chain extender;
  (b) from about 15 to about 25 weight percent of a first organic non-halogenated flame retardant component comprising a phosphinate compound;
  (c) from about 5 to about 10 weight percent of a second organic non-halogenated flame retardant component comprising a phosphate compound;
  (d) from about 2.5 to about 10 weight percent of a third organic non-halogenated flame retardant component selected from pentaerythritol and dipentaerythritol; and
  (e) talc;
  wherein the weight percents are based on the total weight of the thermoplastic polyurethane composition.

10. A flame retardant thermoplastic polyurethane composition consisting essentially of:
 (a) at least one polyether-based thermoplastic polyurethane polymer;
 (b) about 15 to about 25 weight percent of a first organic non-halogenated flame retardant component comprising a phosphinate compound;
 (c) about 5 to about 10 weight percent of a second organic non-halogenated flame retardant component comprising a phosphate compound;
 (d) about 2.5 to about 10 weight percent of a third organic non-halogenated flame retardant component comprising dipentaerythritol; and
 (e) talc;
 wherein the weight percents are based on the total weight of the thermoplastic polyurethane composition.

* * * * *